United States Patent [19]
Toriumi et al.

[11] Patent Number: 5,392,031
[45] Date of Patent: Feb. 21, 1995

[54] ELECTRONIC CLINICAL THERMOMETER

[75] Inventors: Makoto Toriumi; Makoto Ikeda, both of Fujinomiya, Japan

[73] Assignee: Terumo Kabushiki Kaisha, Tokyo, Japan

[21] Appl. No.: 30,726

[22] Filed: Mar. 12, 1993

[30] Foreign Application Priority Data

| Mar. 17, 1992 | [JP] | Japan | 4-060287 |
| Mar. 17, 1992 | [JP] | Japan | 4-060288 |
| Mar. 17, 1992 | [JP] | Japan | 4-060290 |
| Jul. 31, 1992 | [JP] | Japan | 4-205462 |

[51] Int. Cl.$^6$ .............. G08B 21/00; G01K 3/04; G01K 7/00

[52] U.S. Cl. .............. 340/588; 374/102; 374/169; 128/736

[58] Field of Search .............. 374/102, 103, 107, 169; 364/557; 128/736; 340/588

[56] References Cited

U.S. PATENT DOCUMENTS

| 4,504,010 | 3/1985 | Sukimoto et al. | 374/102 |
| 4,579,359 | 3/1986 | Ishizaka et al. | 374/107 |
| 4,592,000 | 5/1986 | Ishizaka et al. | 374/102 |
| 4,629,336 | 12/1986 | Ishizaka | 374/169 |
| 4,648,055 | 3/1987 | Ishizaka et al. | 364/557 |
| 4,811,198 | 3/1989 | Ota et al. | 374/169 |
| 4,843,577 | 6/1989 | Muramoto | 364/557 |
| 4,866,621 | 9/1989 | Ono | 364/413.03 |
| 4,877,333 | 10/1989 | Ota et al. | 374/169 |
| 4,878,184 | 10/1989 | Okada et al. | 374/169 |
| 4,986,669 | 1/1991 | Yamaguchi | 374/107 |
| 5,011,294 | 4/1991 | Yamaguchi | 374/107 |
| 5,066,141 | 11/1991 | Ikeda et al. | 374/169 |
| 5,259,389 | 11/1993 | Muramoto et al. | 364/557 |

FOREIGN PATENT DOCUMENTS

| 0234236 | 9/1987 | European Pat. Off. . |
| 0245838 | 11/1987 | European Pat. Off. . |
| 0290352 | 11/1988 | European Pat. Off. . |
| 0332700 | 9/1989 | European Pat. Off. . |
| 0413814 | 2/1991 | European Pat. Off. . |
| 0421451 | 4/1991 | European Pat. Off. . |
| 0482562 | 4/1992 | European Pat. Off. . |
| 0107374 | 8/1979 | Japan | 374/102 |
| 0225324 | 12/1983 | Japan | 374/169 |
| 2122756 | 1/1984 | United Kingdom | 374/169 |
| 2122784 | 1/1984 | United Kingdom | 374/169 |
| 2133563 | 7/1984 | United Kingdom | 374/169 |
| 2197724 | 5/1988 | United Kingdom . |

*Primary Examiner*—Diego F. F. Gutierrez
*Attorney, Agent, or Firm*—Burns, Doane, Swecker & Mathis

[57] ABSTRACT

An electronic clinical thermometer which detects temperature of a measured part and determines equilibrium temperature by prediction calculation based on change of the detected temperature. One of classified temperature rise data groups is selected based on the change of the detected temperature and one of prediction equations and a set of prediction parameters are designated in accordance with the selected data group. The selected data group can be changed based on change of the detected temperature in a predetermined period after the selection of data group. Further, reliability of the measurement is judged based on the detected or predicted temperature and the predicted value can be corrected if the reliability is insufficient.

14 Claims, 15 Drawing Sheets

FIG. 13

|   | GROUP I | | GROUP II | | GROUP III | | GROUP IV | | GROUP V | | REMEASUREMENT | |
|---|---|---|---|---|---|---|---|---|---|---|---|---|
|   | MAX | MIN | MAX | MIN | MAX | MIN | MAX | MIN | MAX | MIN | MAX | MIN |
| ⓐ | 0.54 | 0.07 | 0.62 | 0.10 | 0.73 | 0.12 | 0.82 | 0.17 | 0.91 | 0.22 | 0.55 | 0.08 |
| ⓑ | 0.39 | 0.03 | 0.44 | 0.05 | 0.54 | 0.08 | 0.63 | 0.10 | 0.71 | 0.15 | 0.43 | 0.05 |
| ⓒ | 0.22 | 0 | 0.25 | 0.02 | 0.35 | 0.04 | 0.43 | 0.05 | 0.50 | 0.10 | 0.24 | 0.02 |
| ⓓ | 0.17 | 0 | 0.18 | 0 | 0.22 | 0.01 | 0.28 | 0.02 | 0.35 | 0.08 | 0.18 | 0 |
| ⓔ | 0.12 | 0 | 0.13 | 0 | 0.16 | 0 | 0.22 | 0 | 0.31 | 0.06 | 0.12 | 0 |
| ⓕ | 0.11 | 0 | 0.12 | 0 | 0.13 | 0 | 0.18 | 0 | 0.28 | 0.05 | 0.11 | 0 |
| ⓖ1 | 0.67 | 0.21 | 0.78 | 0.23 | 0.86 | 0.32 | 0.98 | 0.37 | 1.07 | 0.42 | 0.71 | 0.24 |
| ⓖ2 | 0.54 | 0.30 | 0.64 | 0.33 | 0.77 | 0.40 | 0.83 | 0.47 | 0.91 | 0.54 | 0.60 | 0.32 |

ELECTRONIC CLINICAL THERMOMETER

BACKGROUND OF THE INVENTION

The present invention relates to an electronic clinical thermometer and, more particularly, to an electronic clinical thermometer which selects one of prescribed predictive mathematical equations based on change of detected temperature in transition of temperature measurement time and displays a value obtained by calculating the selected equation as a measured body temperature. Also, the present invention relates to a method for verifying prediction precision of the electronic clinical thermometer.

Conventional prediction type electronic clinical thermometer obtains a predicted value using a prediction equation as follows:

$$Y = T + U$$

(Y: a predicted value; T: detected temperature; U: bias)

The prediction starting point (a point in time where calculation of a predicted equilibrium temperature is started) corresponds to a point where a detected temperature becomes higher than a predetermined value and rate of temperature rise becomes higher than a predetermined value. Prediction validation point (a point in time where the prediction has been realized) corresponds to a point where variation of the predicted value stands within a predetermined range.

The bias U is obtained by various calculations:

$$U = a_1 \times dT/dt + b_1$$

$$U = (a_2 \times t + b_2) \times dT + (c_2 \times t + d_2)$$

(t = time elapsed from the prediction starting point)

Parameters $a_1$, $b_1$, $a_2$, $b_2$, $c_2$ and $d_2$ should be appropriate values in order to maintain precision of the bias U constant regardless of the patient or an element to be measured.

Further, temperature rise prediction data indicating temperature rise statuses are classified into several groups based on characteristics of the patients and elements to be measured, and sets of parameters corresponding to the groups are allotted to used equation. The bias U is weighted in order to maintain continuity of display values. If a weight function $(M) = (t/50)^2$ is used, the display value (H) is:

$$H = T + U \times M$$

In this case, the value H displayed on a display unit becomes the predicted value Y at a point in time where the time t is 50 seconds.

The conventional electronic clinical thermometers have a disadvantage in that, once it starts prediction, it displays a predicted value even when the predictive mathematical equation or parameters are inappropriate. Also, when it judges that the equation or parameters are inappropriate, it does not display the value as an error. In such cases, if the prediction equation or parameters initially selected are inappropriate, or the predicted temperature and/or the detected temperature is unstable, the prediction precision is extremely lowered, or the prediction itself becomes impossible.

Further, in the prediction type electronic clinical thermometer which selects a prediction equations or parameters in accordance with a classified group of temperature rise data, the equation or parameters once assigned to groups are not changed. If the employed prediction equation or parameters are inappropriate, the prediction precision is degraded.

On the other hand, many samples by measurement are needed for evaluation of prediction precision (reliability) of the prediction type electronic clinical thermometer. Such measurement samples may include inappropriate data due to erroneous treatments by users, preventing exact verification. However, in the conventional thermometer, it is impossible to remove the inappropriate data, or if possible, whether or not to remove the data is decided by the user.

SUMMARY OF THE INVENTION

Accordingly, an object of the present invention is to provide an electronic clinical thermometer which eliminates the aforementioned problems and drawbacks and which maintains high prediction precision even when the prediction mathematical equation or parameters are inappropriate or the predicted temperature and/or the detected temperature is unstable.

Another object of the present invention is to provide an electronic clinical thermometer having high prediction precision which is not lowered even when the employed prediction data group is inappropriate.

Further object of the present invention is to provide an electronic clinical thermometer which, if a user's treatment is inappropriate, notifies the user of it.

Another object of the present invention is to improve prediction precision verifying method.

Accordingly, an electronic clinical thermometer according to the present invention, which detects temperature of a measured portion and calculates equilibrium temperature as predicted temperature based on change of a detected temperature in transition of temperature measurement time, comprises: selection means for selecting one of classified temperature rise data group based on the change of the detected temperature in an initial transition of temperature measurement time; and change means for changing the data group selected by the selection means based on change of the detected temperature in transition of predetermined temperature measurement time after the prediction data group has been selected.

In the electronic clinical thermometer, the selection means selects one of prediction equations or a set of prediction parameters in accordance with the selected data group.

The electronic clinical thermometer further comprises prediction correction means for, if the change means cannot change the data group, correcting the predicted equilibrium temperature value.

In the electronic clinical thermometer, the change means changes the data group before/during the prediction calculation once or several times periodically or non-periodically.

In the electronic clinical thermometer, the change means changes the data group if the predicted temperature monotone-increases or monotone-decreases.

The electronic clinical thermometer can further include a notifying means. Such a notifying means can include: judgment means for judging reliability of measurement based on the detected temperature; and notification means for, if the judgment means judges that the reliability of measurement is insufficient, notifying the insufficient reliability of measurement.

Further, an electronic clinical thermometer according to the present invention, which detects temperature of a measured part and calculates equilibrium temperature as predicted temperature based on change of the detected temperature, comprises correction means for correcting the predicted temperature based on change of the predicted temperature.

In the electronic clinical thermometer, the correction means corrects the predicted temperature if the predicted temperature monotone-increases or monotone-decreases.

In the electronic clinical thermometer, the correction means adds a correction value of a predetermined amount or another correction value of an amount corresponding to the change of detected temperature to the predicted temperature in accordance with the change of detected temperature.

In the electronic clinical thermometer, the correction means corrects the predicted temperature, if the predicted temperature or the detected temperature is unstable at a prediction realized time.

In the electronic clinical thermometer, the correction means corrects the detected temperature if the predicted temperature or the detected temperature is unstable at a prediction realized time, and performs prediction calculation again based on the corrected detected temperature.

In the electronic clinical thermometer, wherein the correction means corrects the predicted temperature before/during the prediction calculation once or several times periodically or non-periodically.

The electronic clinical thermometer further comprises: judgment means for judging reliability of measurement based on the detected temperature; and notification means for, if the judgment means judges that the reliability of measurement is insufficient, notifying the insufficient reliability of measurement.

Further, an electronic clinical thermometer according to the present invention, which detects temperature of a measured part and calculates equilibrium temperature as predicted temperature based on change of the detected temperature, comprises: judgment means for judging reliability of measurement based on the detected temperature; and notification means for, if the judgment means judges that the reliability of measurement is insufficient, notifying the insufficient reliability of measurement.

In the electronic clinical thermometer, the judgment means judges appropriateness of the measurement based on at least one of the detected temperature, a temperature rise rate of the detected temperature, a difference value between a maximum value and a minimum value of the detected temperature.

Further, a prediction precision verification method for an electronic clinical thermometer according to the present invention, which detects temperature of a measured part and predicts equilibrium temperature by prediction calculation based on change of the detected temperature, comprises the steps of: judging reliability of the measurement based on the detected temperature; notifying the judgment in the judgment step; and removing data of which the reliability has been notified as inappropriate in the notification step, from prediction precision verification data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a diagram showing maximum values and minimum values corresponding to prediction data groups and measurement time.

DETAILED DESCRIPTION OF THE PREFERRED EMBODIMENT

Preferred embodiment of the present invention will be described in detail in accordance with the accompanying drawings. It should be noted that in the embodiment, the present invention is applied to a prediction type electronic clinical thermometer which selects one of several prescribed predictive mathematical equations based on a classified temperature rise data groups, however, the present invention can be applicable to other prediction type thermometers.

<General Equilibrium Temperature Prediction by Electronic Clinical Thermometer>

Figure 1:
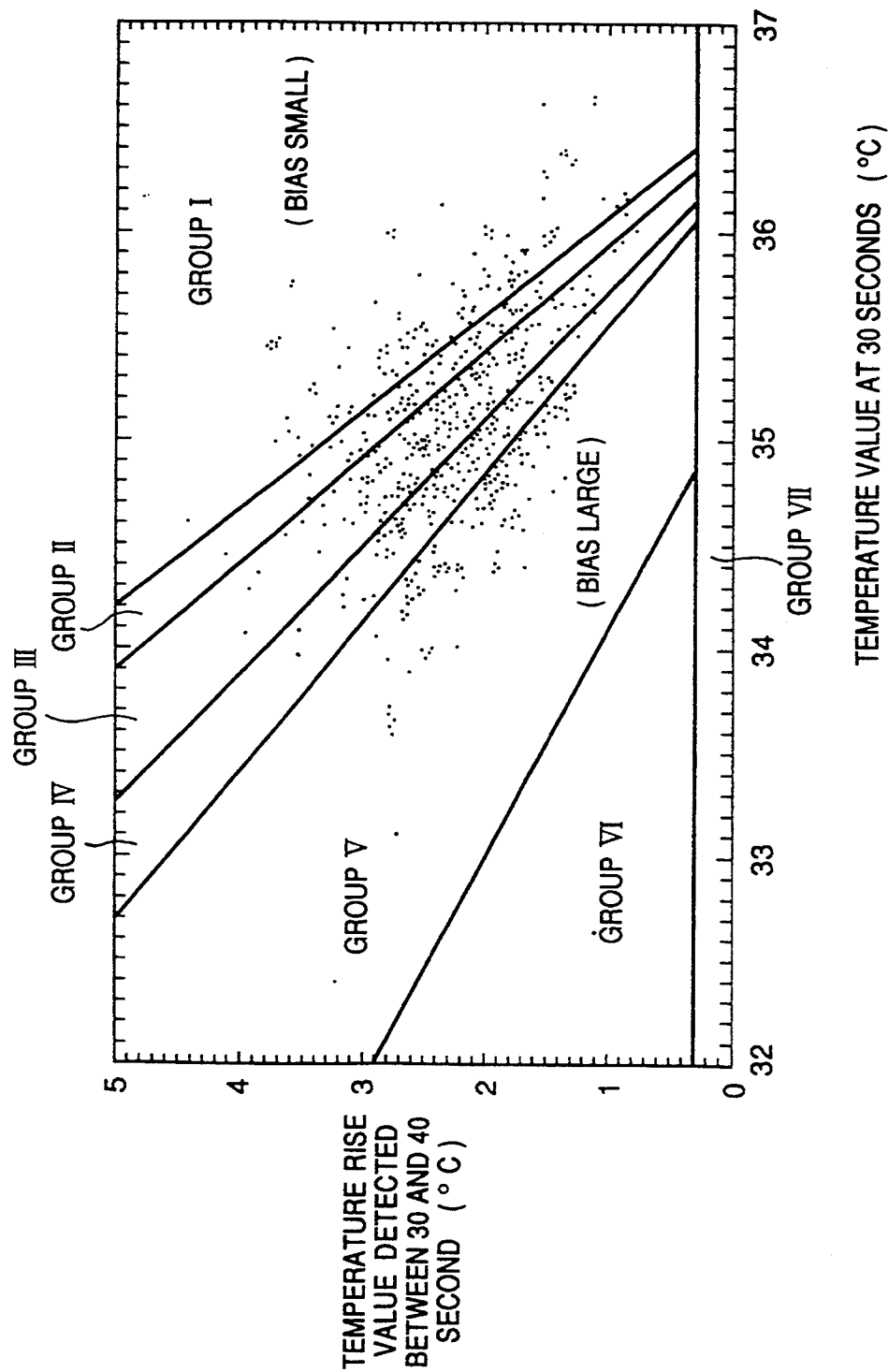
FIG. 1 illustrates classified groups of prediction data indicating temperature rise statuses in an electronic clinical thermometer according to an embodiment of the present invention.
Figure 2:
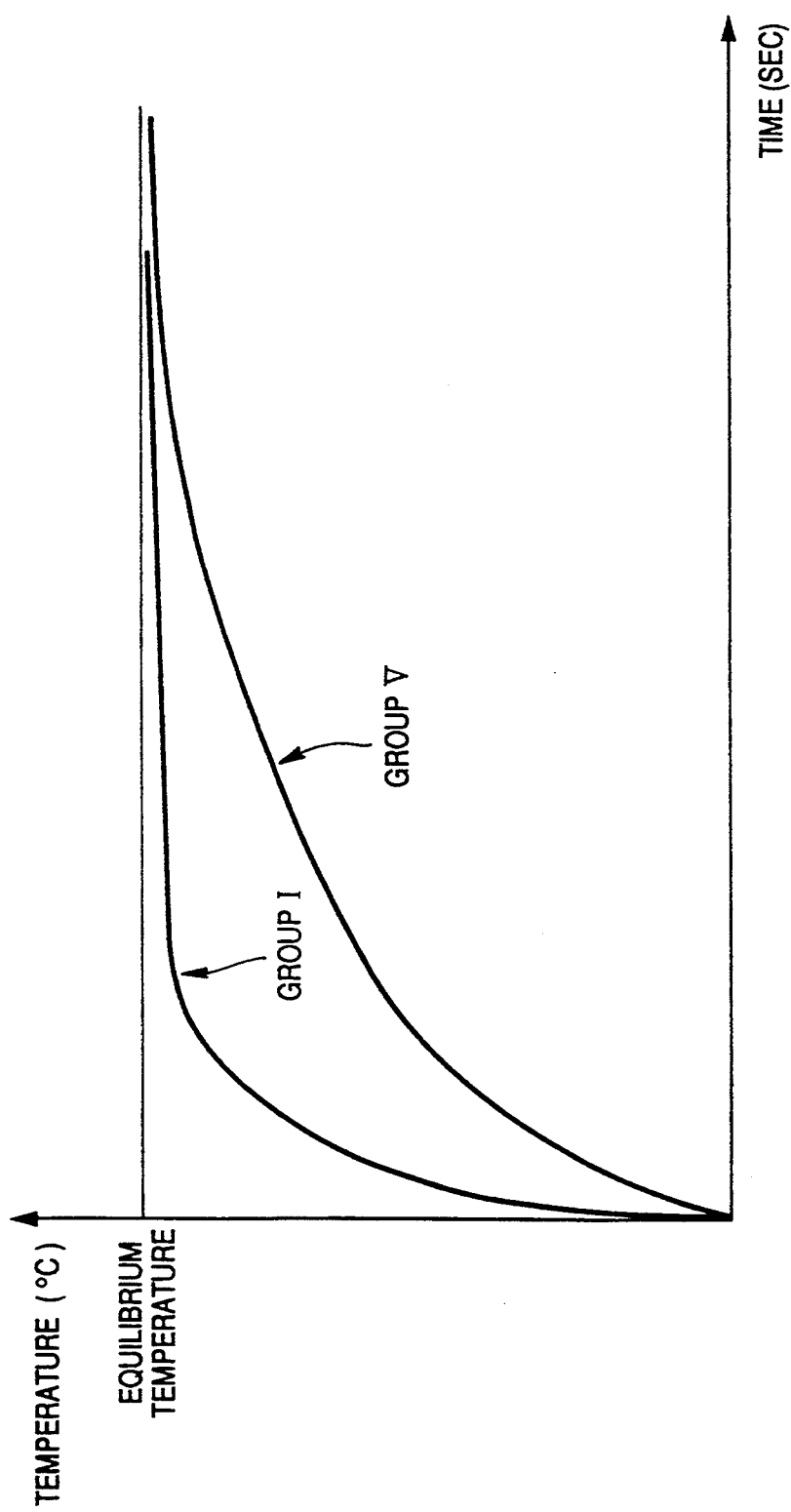
FIG. 2 is a line chart showing as an example temperature rise curves in the electronic clinical thermometer according to the embodiment.

FIGS. 1 and 2 are diagrams for explaining general prediction principle of a prediction type electronic clinical thermometer which selects one of several prescribed predictive mathematical equations based on classified groups of temperature rise prediction data.

The electronic clinical thermometer sequentially performs prediction of body temperature after 600 seconds from the start to measure. Prediction calculation of equilibrium temperature starts at a point in time where a detected temperature becomes equal to or higher than 30° C. and rate of temperature rise becomes equal to or higher than 0.25° C./4 sec.

A predicted value Y is obtained from the following equations:

$$U = (a \times t + b) \times dT(c \times t + d)$$

$$Y = T + U$$

(a–d: constants; dt: temperature rise for past 20 seconds)

Selection of temperature rise prediction data group is performed at a point where prediction time t=40 seconds. FIG. 1 shows prediction data classified into groups I to V based on temperature rise value between 30 to 40 seconds (vertical axis in FIG. 1) and a temperature value at 30 seconds (horizontal axis in FIG. 1). Note that in case of Group VI, prediction calculation is not performed as prediction is impossible and a detected value is displayed. Also, in case of group VII, prediction is not performed and a detected value is displayed because it is determined that the subject of temperature measurement is non-human body. Group I indicates that thermal response is quick. In this group, the temperature is initially high, and soon temperature rise becomes slow. The bias necessary for prediction in this data-group is small. Contrary, group V indicates that thermal response is slower. In this group, the temperature is initially low and temperature rise continues for a long period, and the necessary bias is large. It should be noted that the classification of groups I–VII is obtained from many measurement samples.

After 40 seconds, prediction calculation using coefficients corresponding to the selected group is performed. Following table shows an example of the coefficients a to d in the respective groups from 40 to 60 seconds:

| GROUP | a | b | c | d |
| --- | --- | --- | --- | --- |
| I | 0.03859 | −0.56178 | −0.00642 | 0.78483 |
| II | 0.03363 | −0.15209 | −0.00623 | 0.7967 |
| III | 0.03363 | −0.15209 | −0.00389 | 0.7977 |
| IV | 0.03363 | −0.15209 | −0.00674 | 1.0937 |
| V | 0.06137 | −0.85641 | −0.00701 | 0.95034 |

From 40 seconds to 120 seconds, the constants a to d are changed to predetermined values at every 20 seconds.

Further, the bias U is weighted using weight function $M_1$ for maintaining continuity of display values. By 50 seconds, the display value H is obtained by:

$$H = T + U \times M_1$$

$$M_1 = (t/50)^2$$

The value H displayed on a LCD (liquid crystal display) becomes the predicted value Y from a point where the t=50 seconds.

From 50 seconds to 120 seconds, $$H = T + U \times M_2$$

$$M_2 = 1$$

and there is no weighting to the bias U.

If the prediction is validated between 50 to 120 seconds, a buzzer sounds. Conditions for the prediction validation are:

(1) Temperature rise of the detected value becomes equal to or lower than a predetermined value corresponding to groups and coefficient intervals; and (2) A predicted value becomes stable (slope of a regression line of the predicted value becomes equal to or less than a predetermined value).

Following is an example of temperature rises satisfying the prediction validation condition between 40 to 60 seconds:

Group I≦0.19° C./20 sec.
Group II≦0.23° C./20 sec.
Group III≦0.20° C./20 sec.
Group IV≦0.15° C./20 sec.
Group V≦0.17° C./20 sec.

On the other hand, a slope KA of the regression line of a predicted value is obtained by:

$$SY = Y(t) + Y(t-2) + Y(t-4) + Y(t-6) + Y(t-8) + Y(t-10)$$

$$STY = 2 \times Y(t-2) + 4 \times Y(t-4) + 6 \times Y(t-6) + 8 \times Y(t-8) + 10 \times Y(t-10)$$

$$KA = 20 \times (SY/14 + STY/70)$$

(Y(t) = a predicted value at t)
When the slope KA becomes equal to or less than 0.04° C./20 sec., it is judged that the predicted value has become stable.

If the prediction cannot be validated by 120 seconds, automatic validation is performed at 120 seconds.

After 120 seconds, the display value H is obtained using bias at 120 seconds ($U_{120}$):

$$H = T + U_{120} \times M_3$$

$$M_3 = A \times t + B$$

Constants A and B are changed at 270 seconds. Weight function $M_3$ becomes 1 at 120 seconds and 0 at 600 seconds. From 120 seconds, the function $M_3$ decreases toward 270 seconds with one inclination, and from 270 seconds, it decreases toward 600 seconds with another inclination, which may be represented by a line chart having two inclinations. In this manner, the display value H becomes the detected temperature T after 600 seconds.

The outline of the equilibrium temperature prediction by the latest prediction type electronic clinical thermometer has been described above.

<Improvement in Temperature Prediction>

Figure 3:
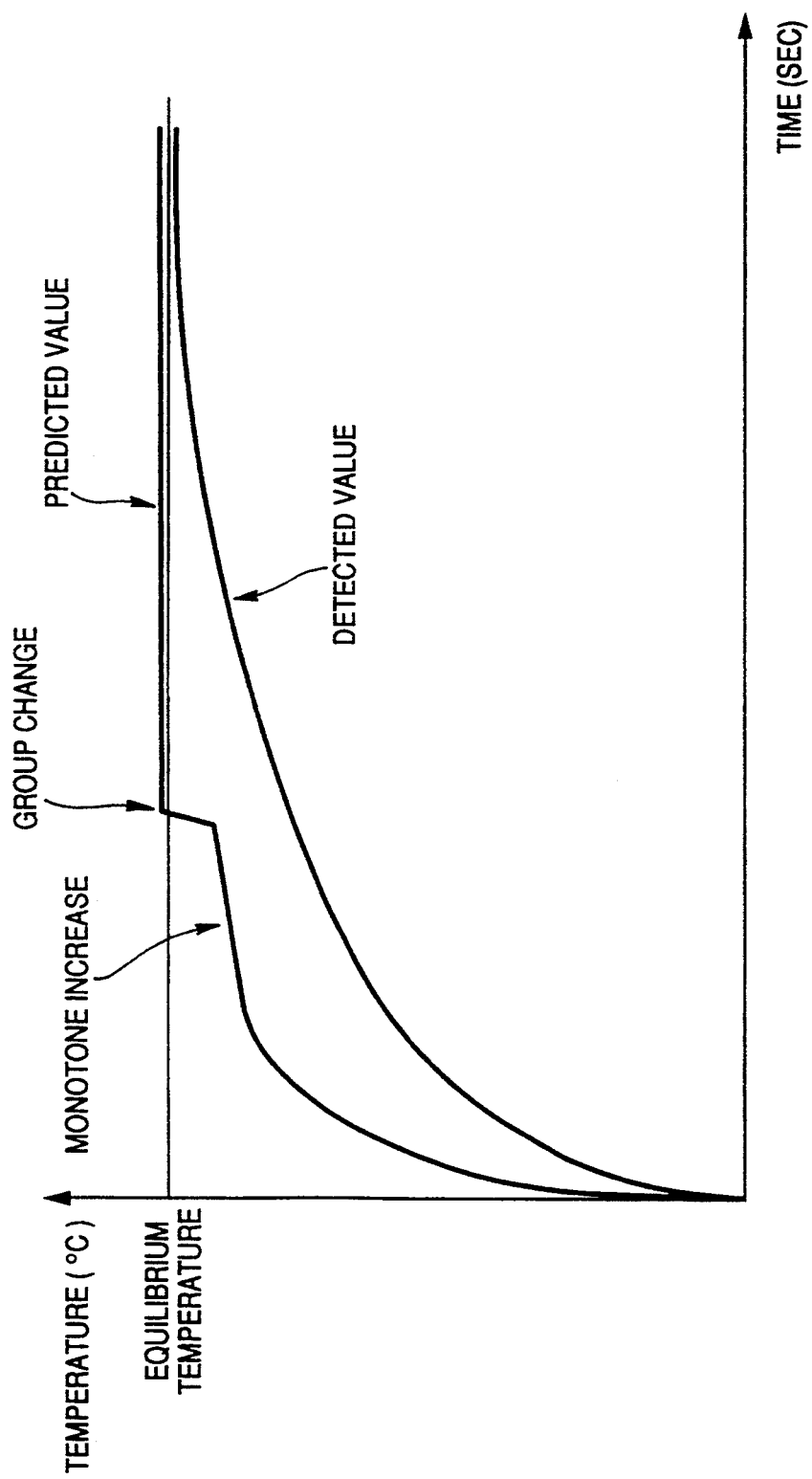
FIG. 3 is a line chart showing change of prediction data group in the electronic clinical thermometer according to the embodiment.

In this embodiment, after the selection of prediction equation or parameters at 40 seconds of the prediction time (t), a predicted value is observed. If it is judged that the selection has been inappropriate, correction is performed by changing prediction equation or parameters to another equation or parameters in accordance with another data group. When a selected prediction equation or parameters are inappropriate, the variation of predicted value becomes monotone increase or monotone decrease. FIG. 3 shows variation of a predicted value (upper line) in this case. In FIG. 3, as bias of the predicted value is insufficient, the prediction equation or parameters according to the selected data group is changed to another equation or parameters according to another data group which produces larger bias. In case of monotone decrease, the prediction equation or parameters is changed to equation or parameters producing smaller bias.

After the selection of prediction equation or parameters, a predicted value is observed in the following manner. If the inclination of the regression line of the predicted value is $\geq 0.02°$ C./20 sec., a flag FKP is set to "1". If the inclination is $\leq -0.02°$ C./20 sec., a flag FKM is set to "1". The regression line of the prediction value from 40 to 80 seconds is observed and the flags FKP and FKM are updated based on the obtained inclination of the regression line. However, once the flags FKP and FKM are set to "1", they are not set to "0" till the prediction time t becomes 80 seconds.

At 80 seconds from the prediction starting point, if the values of flags FKP and FKM are respectively "0" and "0", it is judged that the predicted value is fully stable and the prediction is validated. If the values are "1" and "1", it is judged that the selected prediction equation or parameters are appropriate though the variation of the predicted value has small increases and decreases, and the prediction is continued.

If the values are "1" and "0", it is judged that the prediction value monotone-increases. Unless the group is V, the selected prediction equation or parameters are changed to another equation or parameters producing larger bias. At this time, the flags FKP and FKM are set to "0". Further, the variation of the predicted value between 80 to 100 seconds is observed in a similar manner. If it is judged that the variation shows a monotone increase/decrease, the changed prediction equation or parameters are changed back to the equation or parameters initially selected. If the flags FKP and FKM are "0" and "1", a process inverse to that of the values "1" and "0" is performed.

However, in cases where temperature rise data are not classified and there are only one set of parameters, the bias cannot be adjusted. Also, the bias cannot be adjusted if the selected data group is I or V. In such cases, a correction value is added to the predicted value at automatic prediction validation (at a point in time where the prediction calculation is finished).

At the automatic validation point, if the variation of the predicted value is large, the error between the predicted value and the detected value may be greater. In this case, past predicted values are referred to and a predicted value is calculated again to obtain a display value of higher-precision.

Figure 4:
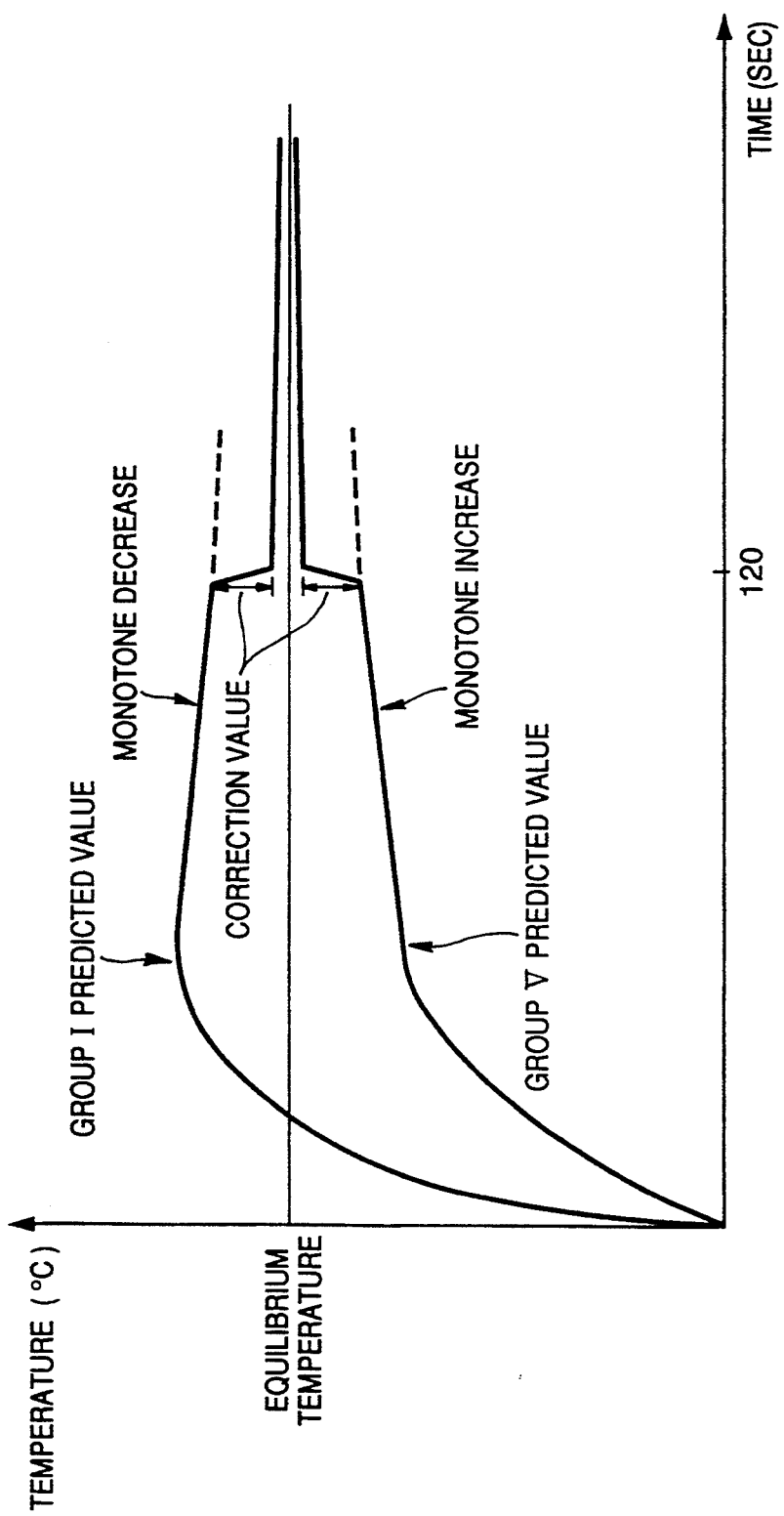
FIG. 4 is a line chart showing correction at automatic validation of prediction in the electronic clinical thermometer according to the embodiment.

FIG. 4 shows the correction at the automatic prediction validation point.

If group V (a group where bias becomes the largest value) is selected at 40 seconds from the prediction starting point and the predicted value monotone-increases, as a larger bias cannot be obtained by group change, a positive correction value is added to the predicted value at the automatic validation point (120 seconds). The correction value is ½ of the variation amount of a prediction value between 40 to 120 seconds, and its maximum value is 0.15° C. In case of group I (a group where bias becomes the smallest value), a process inverse to that in case of group V is performed.

It should be noted that even if group change is not performed, the prediction precision can be maintained by the above-described correction.

In this embodiment, after the detection data group selection at 40 seconds from the prediction starting time, a predicted value is observed, and if the selected prediction equation or parameters are inappropriate or the actual detected value is unstable, the predicted value is corrected at the prediction validation.

At the automatic prediction validation point (120 seconds), if the flags FKP and FKM values are "0" and "0", it is judged that the predicted value is stable and the prediction is validated If "0" and "1", it is judged that the prediction value monotone-decreases, and a process inverse to that in case of "1" and "0" is performed.

Figure 5:
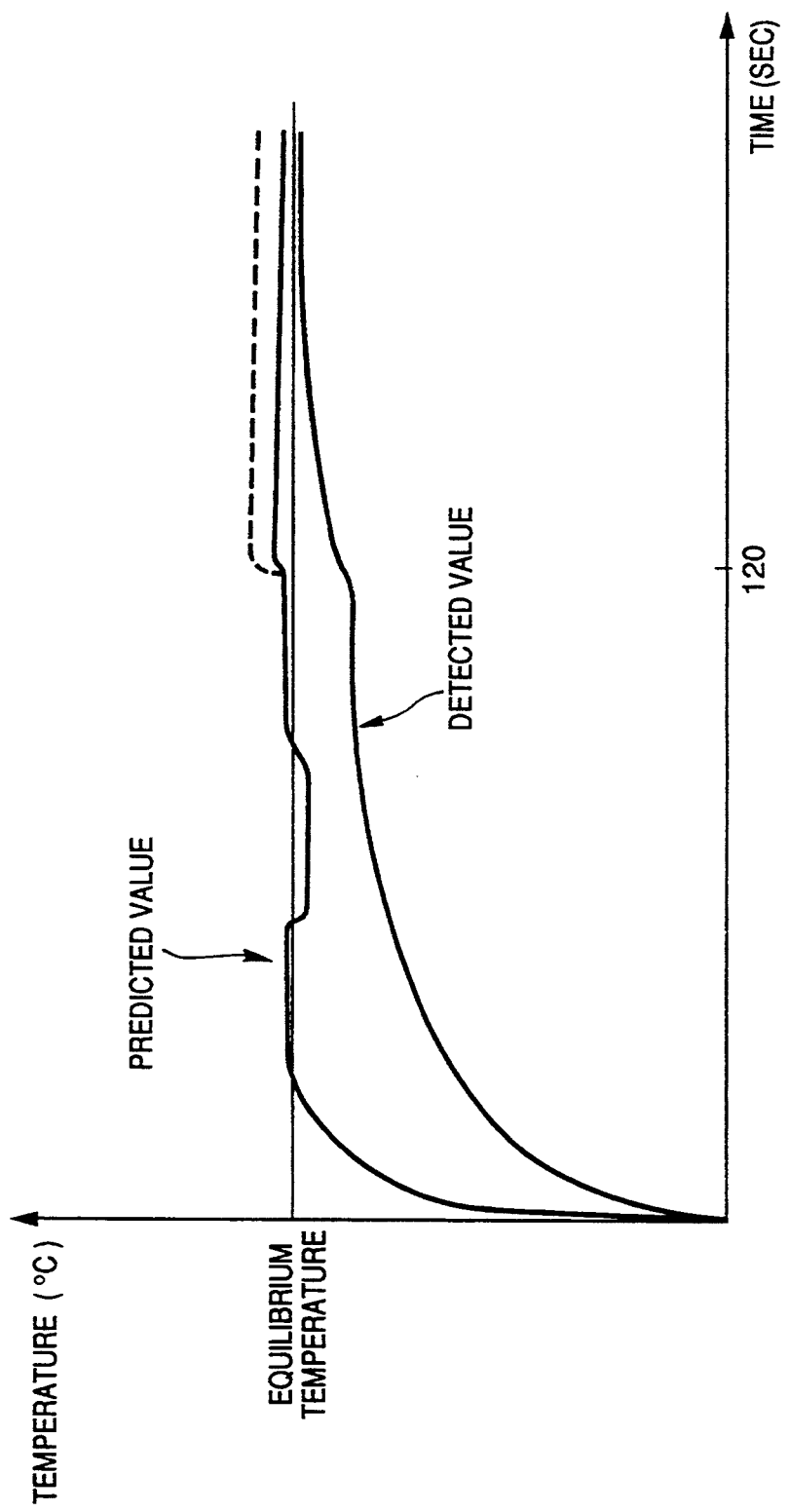
FIG. 5 is a line chart showing another example of correction at the automatic prediction validation in the electronic clinical thermometer according to the embodiment.

If the detected value is unstable, i.e., the flags FKP and FKM values are "1" and "1", and the inclination of the regression line of the predicted value at automatic prediction validation (120 seconds) is equal to or more than a predetermined value ($\geq \pm 0.31°$ C./20 sec.), it is judged that the detected value is unstable as shown in FIG. 5. In this case, an average value between the detected value at 120 seconds and the detected value at a point ten seconds before 120 seconds is calculated, and the obtained value is displayed as a new predicted value.

At the automatic prediction validation point, if the change of the predicted value is large but the predicted value is displayed, the error between the predicted value and the detected value may become greater. In this case, past predicted values are referred to and a predicted value is calculated again to obtain a display value of high-precision. More specifically, past detected temperature values are referred to and correction to the detected temperature is performed, further, prediction calculation is performed again based on the corrected detected temperature.

<Configuration of Electronic Clinical Thermometer>

Figure 6:
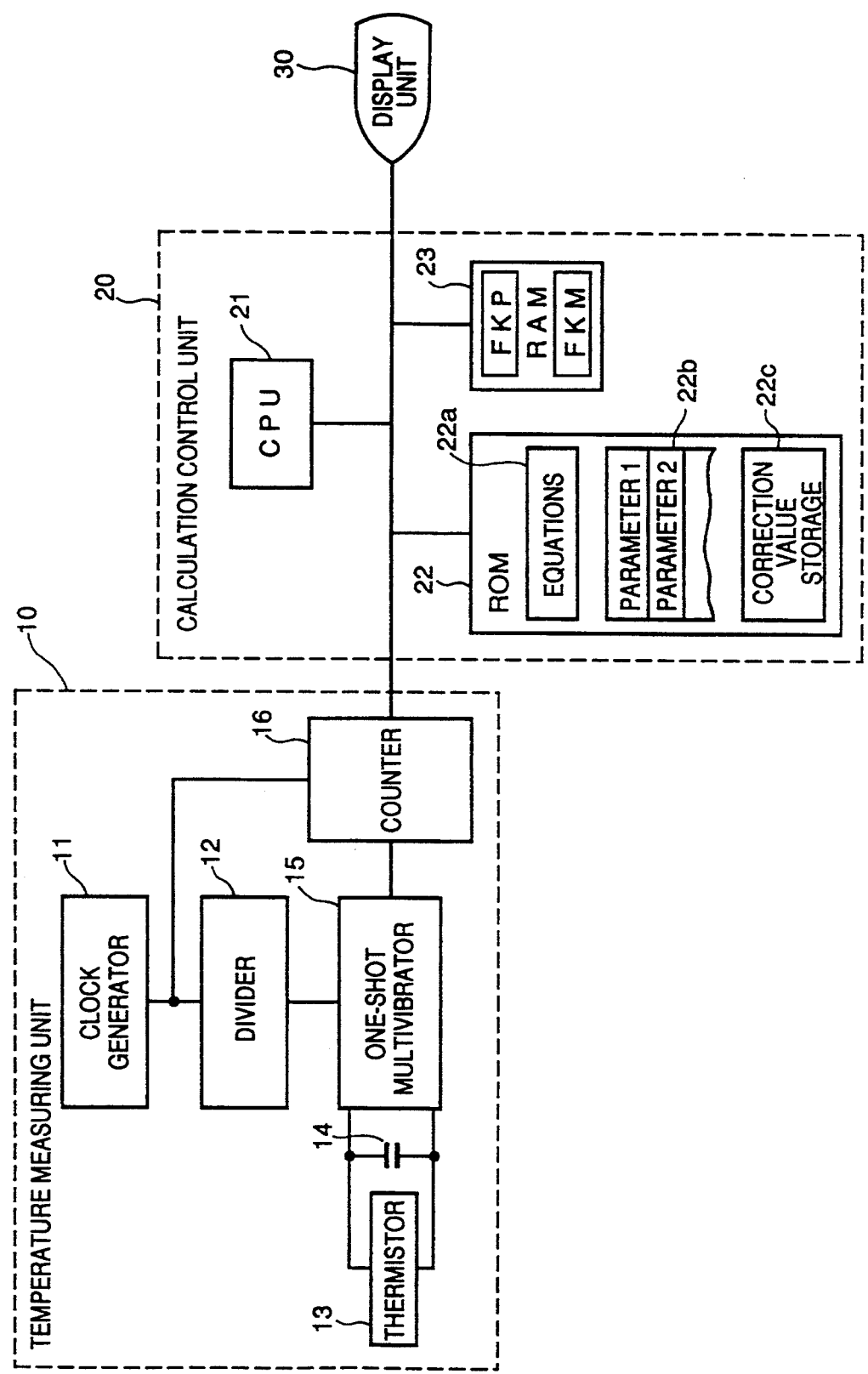
FIG. 6 is a block diagram showing a configuration of the electronic clinical thermometer according to the embodiment.

FIG. 6 is a block diagram showing an example of the configuration of an electronic clinical thermometer according to this embodiment.

The electronic clinical thermometer comprises: a temperature measuring unit 10 which measures body temperature and outputs a measured temperature value as a digital value; a calculation control unit 20 which calculates a predicted value based on the measured temperature and which controls the overall thermometer; and a display unit 30 which displays the measurement result.

The temperature measuring unit 10 includes a thermistor 13 and a capacitor 14 arranged in a thermo-sensitive unit in parallel, a one-shot multivibrator 15 which generates a pulse in accordance with a constant of the thermistor 13 and the capacitor 14, a clock generator 11 which generates a reference clock, a divider 12 which divides the reference clock, and a counter 16 which counts the number of clocks from the clock generator 12 while the output from the one-shot multivibrator 15 is "high". In this construction, the detected temperature value is obtained from the change of the value of the counter 16 in accordance with the temperature of the thermistor 13 and outputted as a digital value. Note that this construction is only one example and it does not impose a limitation upon the present invention.

The calculation control unit 20 includes a CPU 21 for calculation control, a ROM 22 in which control programs are stored and RAM 23 which is used as an auxiliary storage. The ROM 22 has a prediction equation storage 22a for storing equations used in the electronic clinical thermometer, a parameter storage 22b for storing parameters a, b, c and d, and a correction value storage 22c for storing a correction value at automatic prediction validation. The RAM 23 has flags FKP and FKM values, and measured temperature values are stored into the RAM 23 in a time-sequential manner. The calculation control unit 20 controls initial judgment, prediction data group selection, prediction calculation and judgment of prediction validation conditions in the electronic clinical thermometer in accordance with the stored programs.

Figure 7:
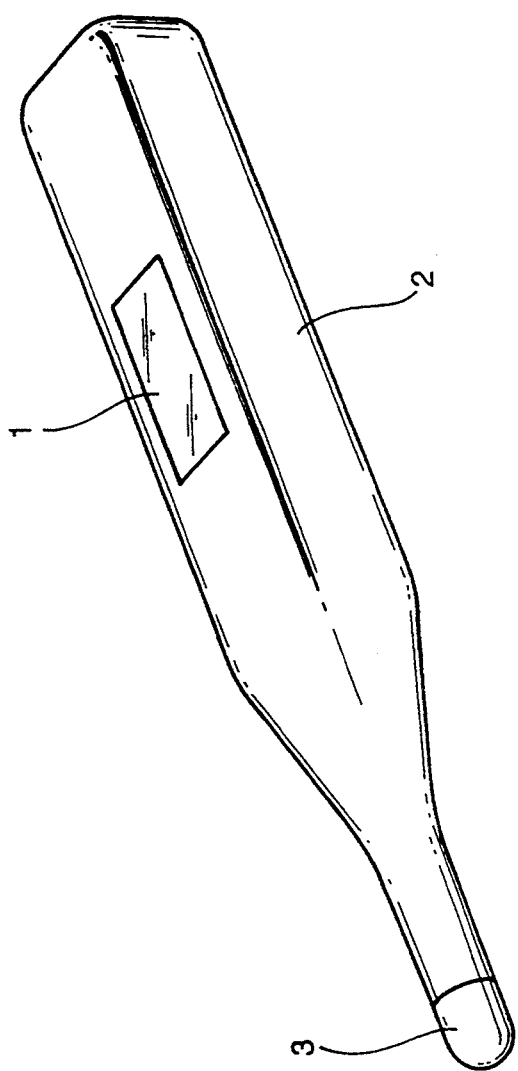
FIG. 7 is an external perspective view of the electronic clinical thermometer according to the embodiment.

FIG. 7 is an external view of the electronic clinical thermometer of this embodiment. The thermometer body comprises a liquid crystal display (LCD) 1 corresponding to the display unit 30, a case 2 and a metalic-tip cap 3 for conducting body temperature to the thermistor 13.

Figure 8:
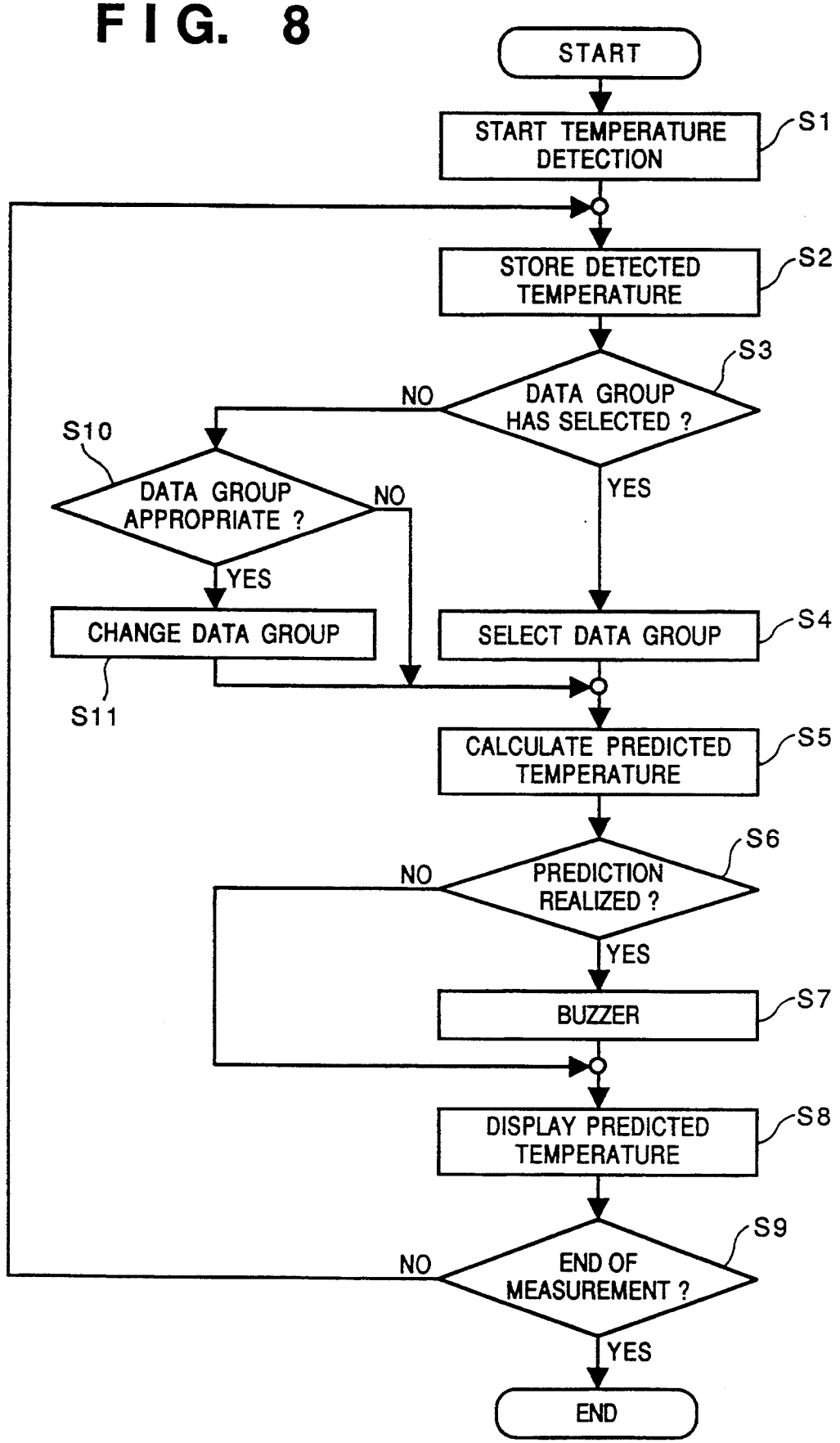
FIG. 8 is a flowchart showing prediction data group change in the embodiment.

Next, the operation of data group change in this embodiment will be described with reference to a flowchart of FIG. 8. It should be noted that a buzzer sounds if condition for obtaining sufficient prediction precision is satisfied.

When the electronic clinical thermometer is powered on by a predetermined starting switch, initialization is performed in step S1. In step S2, data from the temperature measuring unit 10 is stored corresponding to change of time. In step S3, whether or not time from the prediction starting point has become 40 seconds at which the selection of temperature rise prediction data group is performed is determined. If YES, one of classified prediction data group is selected in step S4. As parameters are set by the selection, prediction calculation of equilibrium temperature is performed with the set parameters in step S5. In step S6, whether or not the calculation result satisfies condition for validating prediction which has been selected in advance is determined.

If NO, the process proceeds to step S8 in which a predicted value is displayed on the LCD, and the process returns from step S9 to step S2 to continue the measurement. In case where the prediction is validated, the process proceeds from step S6 to step S7 to sound the buzzer (audible signal) for notifying the prediction validation, then to step S8 to display the predicted value on the LCD, and returns from step S9 to step S2.

If it is judged that the time from the prediction starting point has not become 40 seconds in step S3, whether the selected prediction data group should be changed or not is judged in step S10. If YES, the prediction data group is changed in step S11. The measurement is repeated till a condition for terminating measurement is satisfied. In FIG. 8, correction at automatic prediction validation is not described, however, the correction at automatic prediction validation can be realized by adding simple steps.

Next, the correction operation in the electronic clinical thermometer will be described with reference to a flowchart of FIG. 9. It should be noted that the buzzer sounds if condition for obtaining sufficient prediction precision is satisfied.

When the thermometer is powered on by a predetermined starting switch, initialization is performed in step S1, and data from the temperature measuring unit 10 is stored in step S2. In step S5, prediction calculation is performed using parameters in a selected temperature rise prediction data group. In step S12, whether or not time from the prediction starting point becomes 120 seconds at which automatic prediction validation is performed is determined. If YES, the predicted value obtained by the calculation is corrected in accordance with the aforementioned conditions.

In step S6, whether condition for validating the prediction, which has been selected in advance, is satisfied or not is determined. If NO, the process proceeds to step S8 to display the predicted value on the LCD, and returns from step S9 to step S2 to continue the measurement. If YES, the process proceeds from step S6 to step S7 to sound the buzzer, then to step S8 to display the predicted value on the LCD, and returns from step S9 to step S2.

The measurement is repeated until termination condition is satisfied. When a condition is satisfied, e.g., the thermometer is removed from the measured part, the measurement is terminated.

Figure 9:
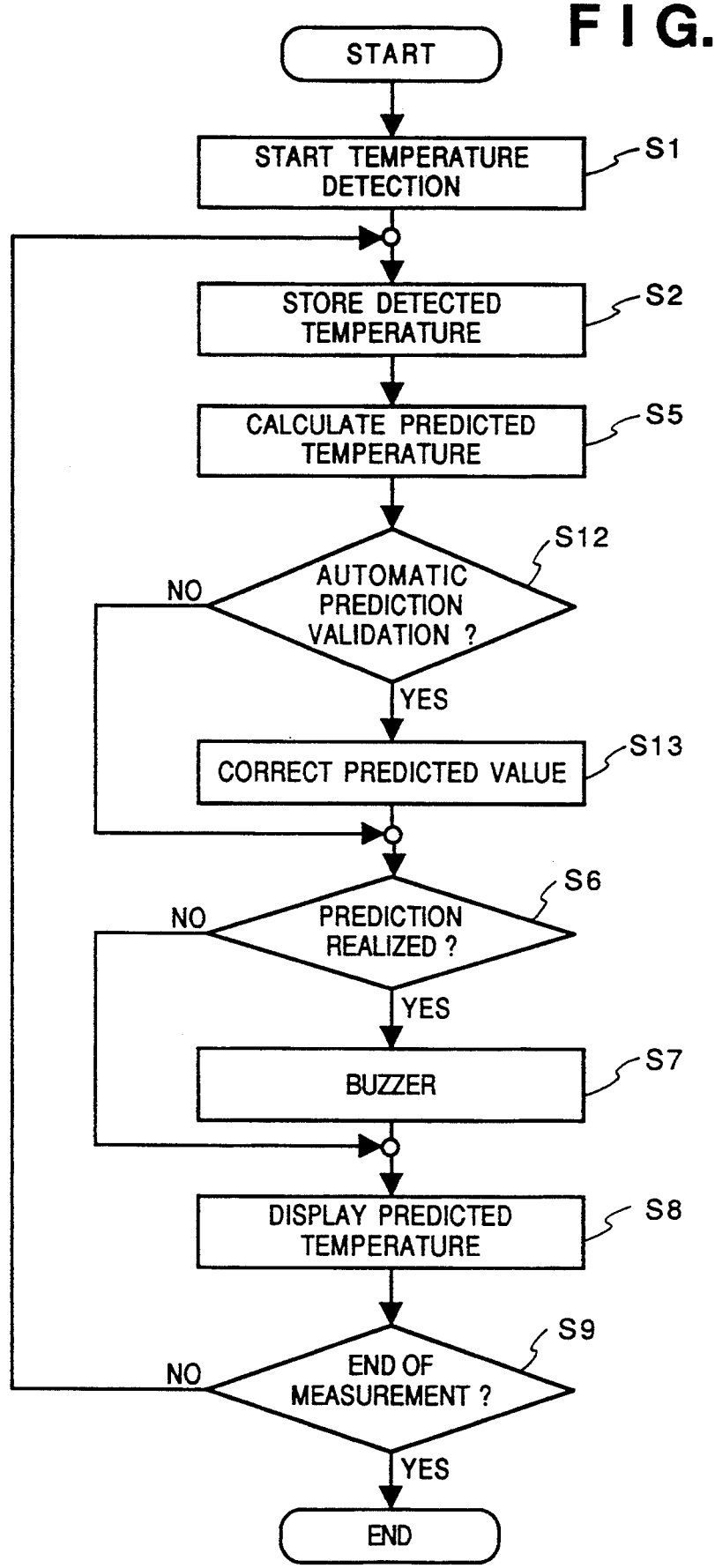
FIG. 9 is a flowchart showing correction operation in the embodiment.

It should be noted that steps of the data group change can be added to the flowchart of FIG. 9.

<Improvement in Prediction Precision Verification>

In this embodiment, when the prediction precision of the electronic clinical thermometer is verified, the variation of a detected value is observed as an auxiliary verification. If the thermometer is treated by the user erroneously, the verification cannot be accurate. Accordingly, this embodiment is arranged such that the user is notified whether the treatment is to be inappropriate.

Figure 10:
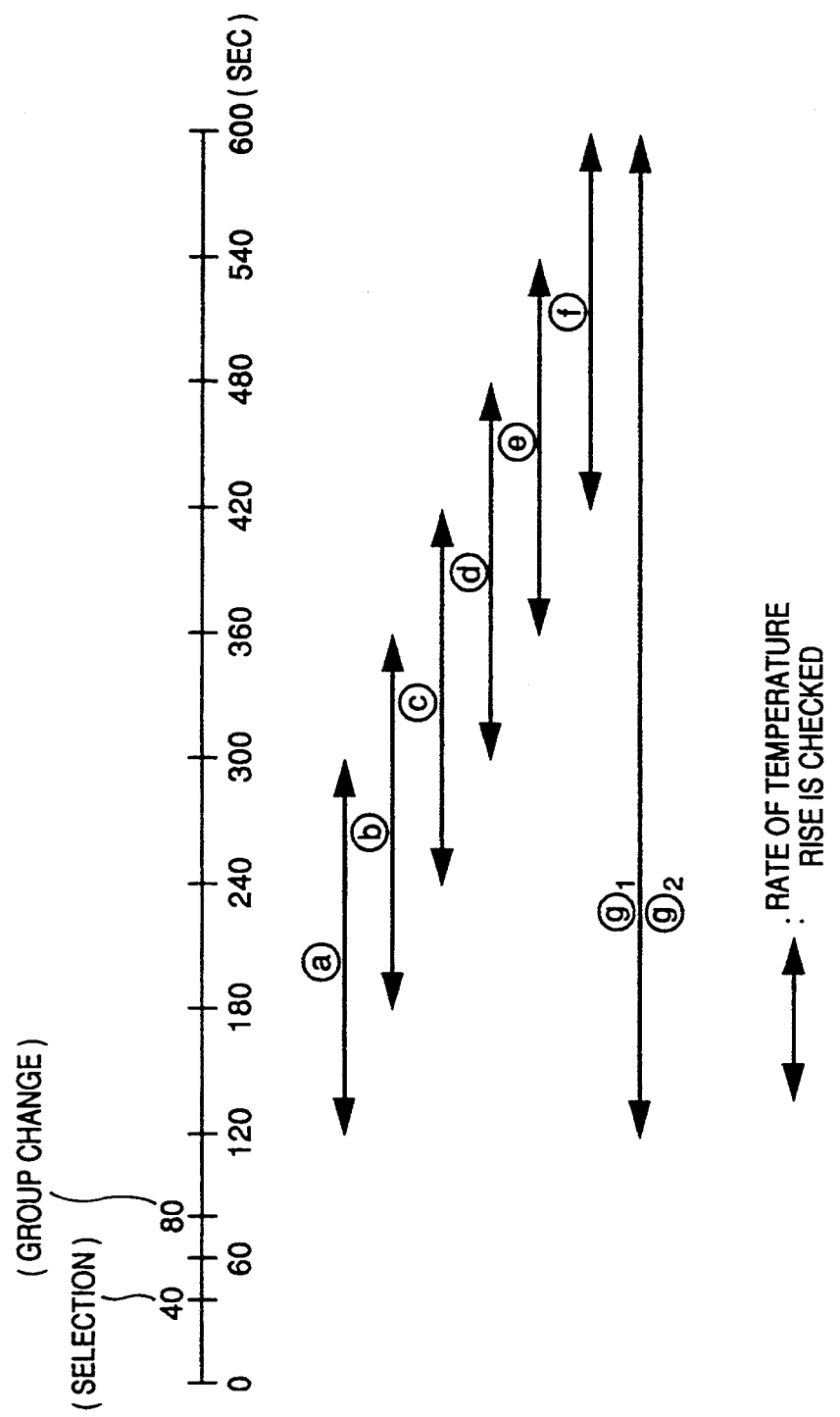
FIG. 10 is a time chart showing an example of judgment of detected temperature by the electronic clinical thermometer according to the embodiment.

More specifically, as shown in FIG. 10, the bias of temperature rise in past 180 seconds is compared with respective maximum value,s and minimum values determined corresponding to the prediction data groups and time. From 300 seconds from the measurement starting point, the comparison is performed at every 60 seconds. If the comparison result is out of an allowable range, the measurement is judged to be inappropriate. FIG. 13 shows an example of the abovementioned maximum values and minimum values.

Further, at 600 seconds from the start to measure the temperature, the bias of temperature rise between 120 to 600 seconds is verified. In this verification, if the variation of the predicted value by 120 seconds is large, the maximum values and the minimum values respectively lower and higher (ⓖ$_2$ in FIG. 13) than normal values (ⓖ$_1$ in FIG. 13) are set.

If the measurement is judged to be inappropriate, the buzzer sounds once at 600 seconds (three times if appropriate). The data of inappropriate measurement can be removed from prediction precision verifying data. Thus, the prediction precision of the thermometer as its performance can be verified.

<Another Configuration of Electronic Clinical Thermometer>

Figure 11:
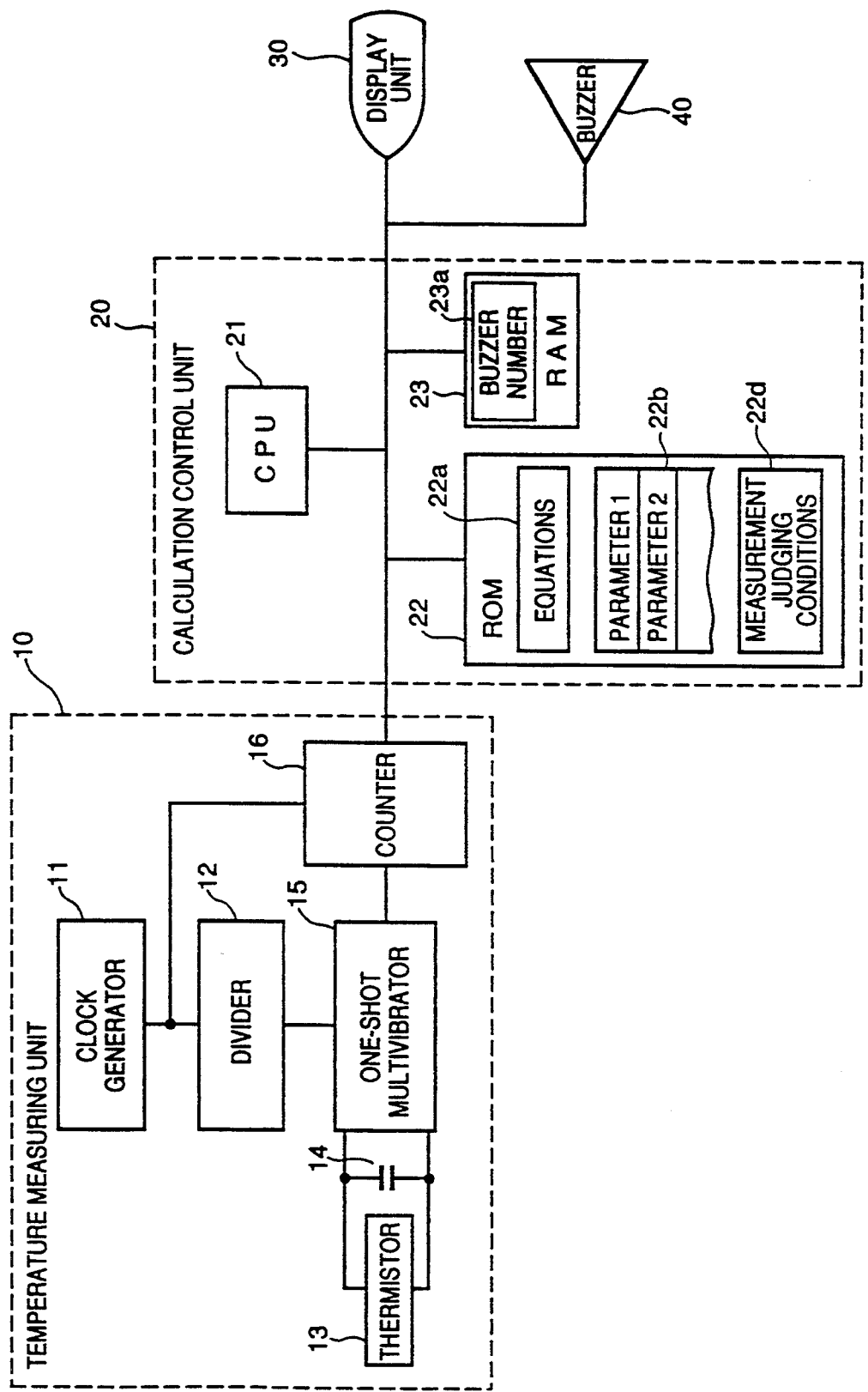
FIG. 11 is a block diagram showing another configuration of an electronic clinical thermometer according to the embodiment of the present invention.

FIG. 11 is a block diagram showing another example of the configuration of an electronic clinical thermometer according to the embodiment.

The electronic clinical thermometer comprises: a temperature measuring unit 10 which measures body temperature and outputs a measured temperature value as a digital value; a calculation control unit 20 which calculates a predicted value based on the measured temperature and which controls the overall thermometer; a display unit 30 which displays the measurement result; and a buzzer 40.

The temperature measuring unit 10 has the same construction as that shown in FIG. 6, therefore, the detailed description of the construction will be omitted.

The calculation control unit 20 includes a CPU 21 for calculation control, a ROM in which control programs are stored and RAM 23 which is used as an auxiliary storage. The ROM 22 has a prediction equation storage 22a for storing equations used in the electronic clinical thermometer, a parameter storage 22b for storing parameters a, b, c and d, and a judgment condition storage 22d for storing conditions for judging unstable status of a detected temperature. The RAM 23 has a value of a buzzer flag 23a indicating the number of buzzering, and measured temperature values are stored into the RAM 23 in a time-sequential manner. The calculation control unit 20 controls initial judgment, prediction data group selection, prediction calculation and judgment of unstable status of detected temperature and prediction validation conditions in accordance with the stored programs.

It should be noted that external view of the electronic clinical thermometer of the above construction is similar to that shown in FIG. 7.

Figure 12:
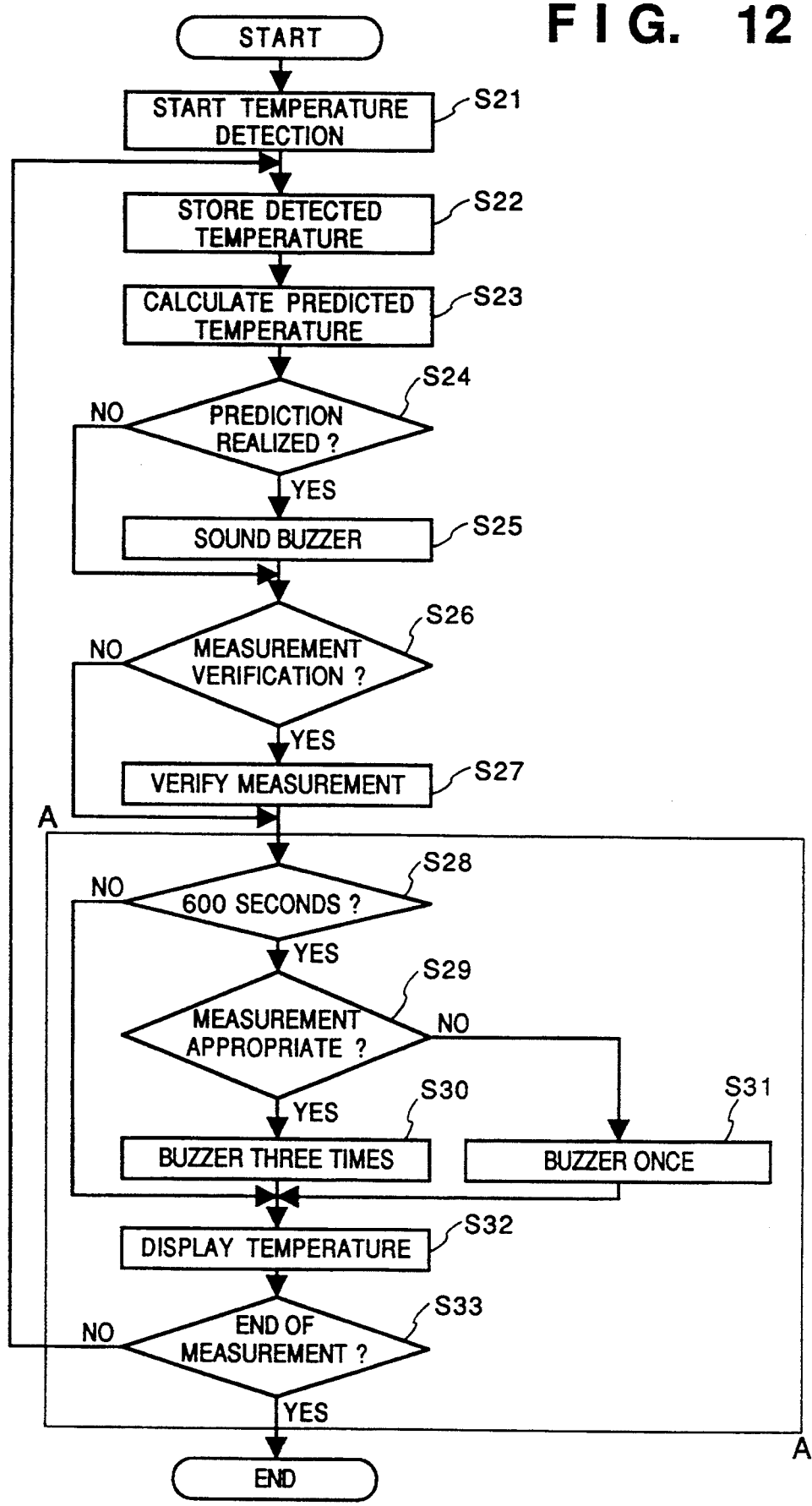
FIG. 12 is a flowchart showing actual detection judgment by the electronic clinical thermometer according to the embodiment.

Next, the prediction precision verifying operation of the thermometer will be described with reference to a flowchart of FIG. 12. Note that the buzzer sounds if condition for obtaining sufficient prediction precision is satisfied.

First, the electronic clinical thermometer is powered on by a predetermined starting switch, and initialization is performed in step S21. Data from the temperature measuring unit 10 is stored corresponding to change of time in step S22. In step S23, prediction calculation of equilibrium temperature is performed using parameters based on a selected temperature rise prediction data group. Whether the buzzer is sounded or not is judged in step S24. If the prediction has been realized, the flow advances to step S25 in which the buzzer is sounded.

In step S26, whether the actual detected value should be verified or not is judged. If NO, the flow, advances to step S28, while it advances to step S27 to perform verification of the detected value, then advances to step S28.

In step S28, whether time from the prediction starting point is 600 seconds from the start to measure the temperature or not is judged. If NO, the predicted value is displayed on the LCD, and the flow returns from step S33 to step S22. On the other hand, if YES in step S28, whether the measurement has been appropriate or not is judged in step S29. If YES, the buzzer is sounded three times in step S30. If NO, the buzzer is sounded once in step S31 and the predicted value is displayed on the LCD in step S32, then the flow returns from step S33 to step S22.

The measurement is repeated until the electronic clinical thermometer is reset, e.g., the thermometer is removed from the measured part. In such case, the measurement is terminated.

Figure 14:
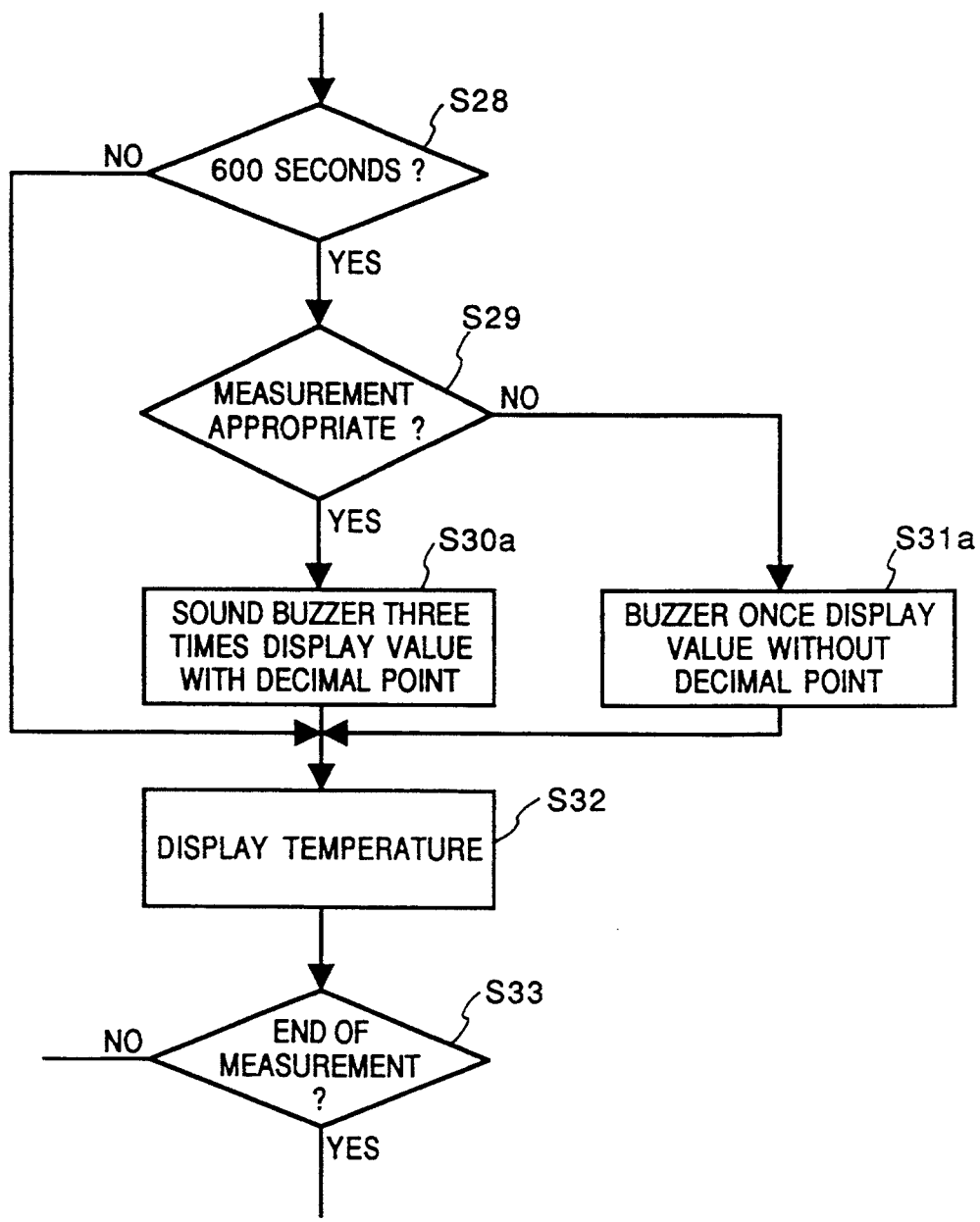
FIGS. 14 and 15 are a flowcharts showing other examples of actual detection judgment by the electronic clinical thermometer according to the embodiment.

FIG. 14 is a flowchart showing operation for notifying the measurement judgment, i.e., whether measurement is appropriate or inappropriate. This flowchart corresponds to steps S28 to S33 in FIG. 12, as surrounded by a rectangle A—A, and the other steps of FIG. 14 are the same as those of FIG. 12.

In FIG. 14, whether time from the measurement starting point has become 600 seconds from the start to measure the temperature or not is judged in step S28. If NO, the flow advances to step S32 to display the detected value on the LCD and returns to step S22. If YES, whether the measurement is appropriate or inappropriate is judged in step S29. If YES, the buzzer is sounded three times and the value is displayed with a decimal point (only displaying the decimal point) in step S30a. If NO, the buzzer is sounded once and the value is displayed without decimal point (not displaying the decimal point) in step S31a. In step S32, the value when the buzzer is sounded in step S25 (the prediction realized value) and the detected value at 600 seconds are alternately displayed on the LCD. Thereafter, the measurement is terminated in step S33.

Figure 15:
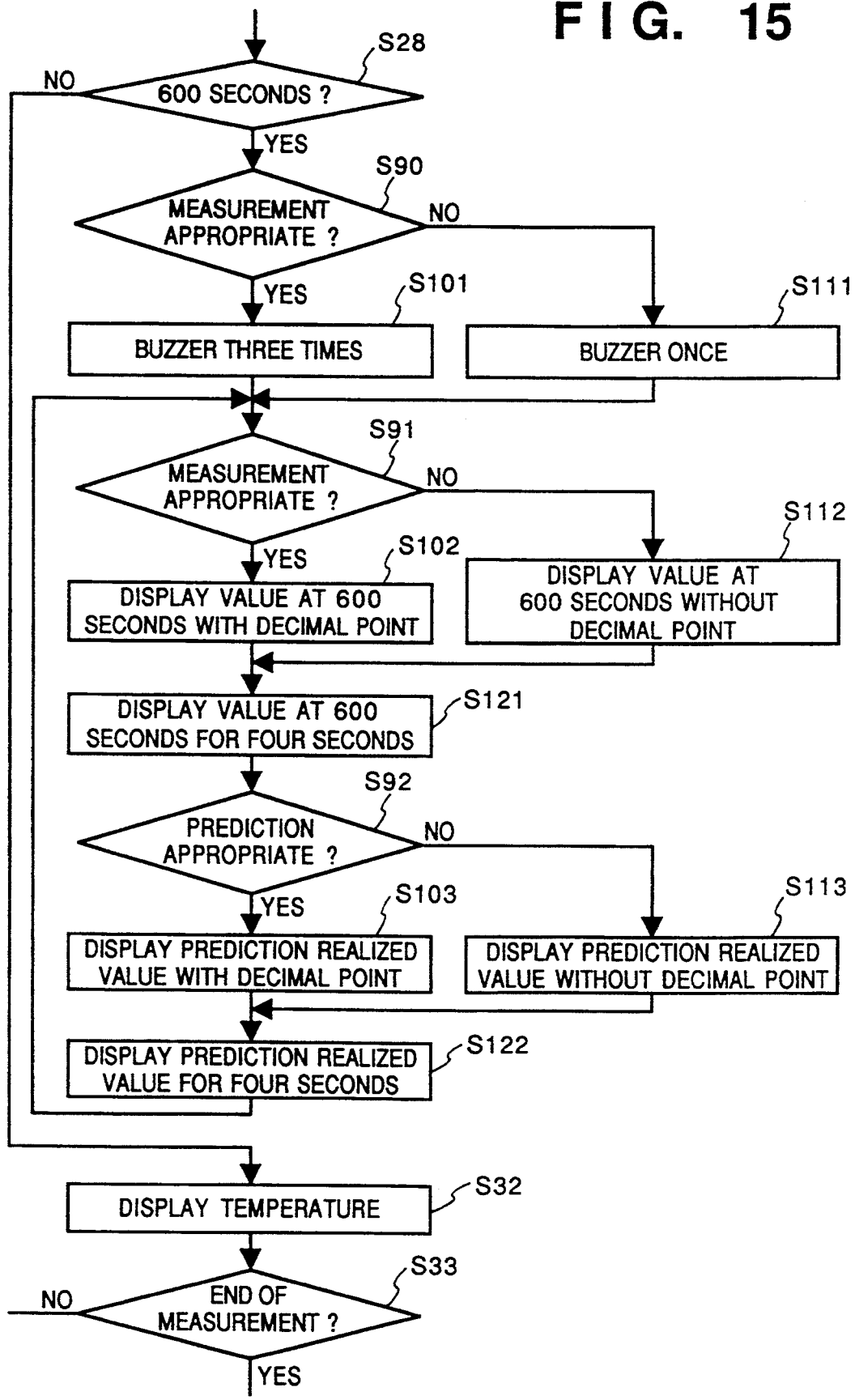

FIG. 15 is a flowchart showing display operation of a prediction value and a detected value and notifying operation of the judgment of prediction and measurement to a user. Similarly to FIG. 14, FIG. 15 corresponds to steps S28 to S33 in FIG. 12.

In FIG. 15, whether time from the measurement starting point is 600 seconds or not is judged in step S28. If NO, the flow advances to step S32 to display the detected value on the LCD and returns to step S22. If YES, whether the measurement is appropriate or not is judged in step S90. If YES, the buzzer is sounded three times in step S101, if NO, the buzzer is sounded once in step S111.

In step S91, whether the measurement is appropriate or not is judged again. If YES, the detected value at 600 seconds is displayed with a decimal point in step S102. If NO, the value is displayed without decimal point in step S112. In step S121, the detected value at 600 seconds is displayed for four seconds.

In step S92, whether the prediction is appropriate or not is judged. If YES, the prediction realized value is displayed with a decimal point in step S103. If NO, the value is displayed without decimal point in step S113. In step S122, the value when the buzzer is sounded in step S25 (the prediction realized value) is displayed for four seconds. Thereafter, the flow returns to step S91 to repeat the display operation. In this manner, the detected value at 600 seconds and the prediction realized value in step S25 are alternately displayed.

It should be noted that in the embodiment, the present invention is applied to a prediction type electronic clinical thermometer which selects one of prescribed predictive mathematical equations based on a selected one of classified temperature rise prediction data groups, however, the present invention can be applicable to other prediction type thermometers. As described above, according to the present invention, an electronic clinical thermometer which maintains high prediction precision even when a selected predictive mathematical equation is inappropriate or predicted temperature and/or detected temperature is unstable can be provided.

Further, an electronic clinical thermometer which maintains high prediction precision regardless of initial selection of temperature rise data group can be provided.

In addition, an electronic clinical thermometer which notifies a user of inappropriate treatment by the user can be provided.

Further, a reliable prediction precision verifying method of an electronic clinical thermometer according to the present invention can be provided.

As many apparently widely different embodiments of the present invention can be made without departing from the spirit and scope thereof, it is to be understood that the invention is not limited to the specific embodiments thereof except as defined in the appended claims.

What is claimed is:

1. An electronic clinical thermometer which detects temperature of a measured portion and calculates an equilibrium temperature as a predicted temperature based on a change of the detected temperature in transition of temperature measurement time, comprising:
   selection means for selecting a data group from among a plurality of classified temperature rise data groups based on a change of the detected temperature in an initial transition of temperature measurement time, and then selecting a prediction equation or a set of prediction parameters in accordance with said selected data group;
   change means for changing the data group selected by said selection means based on a change of the detected temperature in a transition of predetermined temperature measurement time after the data group has been selected;
   means for notifying that reliability of the detected temperature is insufficient; and
   correction means for, if the change means cannot change the data group when changing is necessary, correcting the predicted equilibrium temperature.

2. The electronic clinical thermometer according to claim 1, wherein said change means changes the data group if the predicted temperature monotone-increases or monotone-decreases.

3. The electronic clinical thermometer according to claim 1, said change means changes the data group before or during the prediction of temperature at least once periodically or not-periodically.

4. The electronic clinical thermometer according to claim 1, wherein said correction means corrects the predicted equilibrium temperature by adding or subtracting a constant value or a value corresponding to a change of the detected temperature with respect to the predicted equilibrium temperature.

5. The electronic clinical thermometer according to claim 1, wherein said correction means corrects the predicted equilibrium temperature based on a past predicted equilibrium temperature.

6. The electronic clinical thermometer according to claim 1, wherein said correction means corrects the predicted equilibrium temperature by correcting the detected temperature based on a past detected temperature.

7. The electronic clinical thermometer according to claim 1, wherein said notifying means further includes:
   judgement means for judging reliability of measurement based on the detected temperature; and
   notification means for, if said judgement means judges that the reliability of measurement is insufficient, providing notification of the insufficient reliability of measurement.

8. An electronic clinical thermometer which detects temperature of a measured portion and calculates an equilibrium temperature as a predicted temperature based on a change of the detected temperature in transition of temperature measurement time, comprising:
   selection means for selecting a data group from among a plurality of classified temperature rise data groups based on a change of the detected temperature in an initial transition of temperature measurement time, and then selecting a prediction equation or a set of prediction parameters in accordance with said selected data group;
   means for notifying that reliability of the detected temperature is insufficient; and
   change means for changing the data group selected by said selection means based on a change of the detected temperature in a transition of a predetermined temperature measurement time after the data group has been selected.

9. The electronic clinical thermometer according to claim 8, wherein said change means changes the data group if the predicted temperature monotone-increases or monotone-decreases.

10. The electronic clinical thermometer according to claim 8, wherein said change means changes the data group before or during the prediction of temperature at least once periodically or not-periodically.

11. The electronic clinical thermometer according to claim 8, wherein said notifying means further includes:
   judgement means for judging reliability of measurement based on the detected temperature; and
   notification means for, if said judgement means judges that the reliability of measurement is insufficient, providing notification of the insufficient reliability of measurement.

12. The electronic clinical thermometer according to claim 8, wherein said correction means corrects the predicted equilibrium temperature by adding or subtracting a constant value or a value corresponding to a change of the detected temperature with respect to the predicted equilibrium temperature.

13. The electronic clinical thermometer according to claim 8, wherein said correction means corrects the predicted equilibrium temperature based on a past predicted equilibrium temperature.

14. The electronic clinical thermometer according to claim 8, wherein said correction means corrects the predicted equilibrium temperature by correcting the detected temperature based on a past detected temperature.

* * * * *

UNITED STATES PATENT AND TRADEMARK OFFICE
CERTIFICATE OF CORRECTION

PATENT NO. : 5,392,031
DATED : February 21, 1995
INVENTOR(S) : Makoto TORIUMI et al It is certified that error appears in the above-indentified patent and that said Letters Patent is hereby corrected as shown below:

In Column 2, line 26, delete "high." and insert -- high --.

In Column 4, line 59, delete "EMBODIMENT" and insert -- EMBODIMENTS --.

In Column 5, line 23, delete "dt:" and insert -- dT: --.

In Column 9, line 42, delete "$5" and insert -- S5 --.

In Column 9, line 52, delete "$8" and insert -- S8 --.

In Column 10, line 39, delete "value,s" and insert -- values --.

Signed and Sealed this

Sixth Day of June, 1995

Attest:

BRUCE LEHMAN

Attesting Officer      Commissioner of Patents and Trademarks